(12) United States Patent
Sharma et al.

(10) Patent No.: US 7,478,147 B2
(45) Date of Patent: Jan. 13, 2009

(54) METHOD AND APPARATUS FOR A SECURE NETWORK INSTALL

(75) Inventors: Rakesh Sharma, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 11/186,668

(22) Filed: Jul. 21, 2005

(65) Prior Publication Data

US 2007/0022184 A1    Jan. 25, 2007

(51) Int. Cl.
*G06F 15/177*    (2006.01)
*G06F 9/445*    (2006.01)

(52) U.S. Cl. .................... 709/220; 717/176

(58) Field of Classification Search ......... 709/220–222, 709/223–226, 202, 203, 206, 228
See application file for complete search history.

(56) References Cited

U.S. PATENT DOCUMENTS

| | | | | |
|---|---|---|---|---|
| 5,555,416 | A | 9/1996 | Owens et al. | 395/700 |
| 5,764,593 | A | 6/1998 | Turpin et al. | 395/652 |
| 6,898,701 | B2 | 5/2005 | French et al. | 713/2 |
| 7,376,945 | B1 * | 5/2008 | Kakumani et al. | 717/171 |
| 2003/0005096 | A1 | 1/2003 | Paul et al. | 709/222 |
| 2003/0097553 | A1 | 5/2003 | Frye | |
| 2004/0254978 | A1 | 12/2004 | Ibanez et al. | 709/203 |
| 2005/0071677 | A1 | 3/2005 | Khanna et al. | 713/201 |

OTHER PUBLICATIONS

Ziring, National Security Agency, "TFTP Compression and Security Options", IETF Standard Working Draft, Internet Engineering Task Force, IETF, CH, No. 1, May 26, 1999, pp. 1-19.

INTEL, "Preboot Execution Environment (PXE) Specification, Version 2.1", Sep. 20, 1999, pp. 1-101 http://www.pix.net/software/pxeboot/archive/pxespec.pdf.

* cited by examiner

*Primary Examiner*—Paul H Kang
(74) *Attorney, Agent, or Firm*—Duke W. Yee; Matthew W. Baca; Gerald H. Glanzman (57) ABSTRACT

A method, an apparatus, and computer instructions are provided for a secure network install. One aspect of the present invention provides a proxy server within the same subnet of the client for performing a lookup of the boot image file and downloading the boot image file from a boot file server in a secure manner. The client in turn downloads the file from the proxy TFTP server. Another aspect of the present invention modifies the client remote boot code to include a secure boot file download discovery (SBDD) mode. The client starts the SBDD mode by sending a request for a boot image file to a subnet broadcast address and port, which is listened by a proxy TFTP server. The proxy TFTP server receives the client request and downloads the boot image file. The client in turn downloads the boot image file from the proxy TFTP server.

1 Claim, 6 Drawing Sheets

METHOD AND APPARATUS FOR A SECURE NETWORK INSTALL

BACKGROUND OF THE INVENTION

1. Field of the Invention

The present invention relates generally to a data processing system. In particular, the present invention relates to a boot image network install in a data processing system. Still more particularly, the present invention relates to a secure boot image network install in a data processing system with or without changing the remote boot code.

2. Description of the Related Art

Currently, data center administrators often use Trivial File Transfer Protocol (TFTP) servers to perform uploads or downloads of boot image files over a network. Boot image files include executable images, configurations that are used to boot and configure devices, such as, workstations, hubs, and switches, and other information necessary for the devices to install the executable images. Trivial File Transfer Protocol is one of the Internet Activities Board (IAB) official protocol standards.

Trivial File Transfer Protocol is a simple protocol used to transfer files. Since Trivial File Transfer Protocol is implemented on top of the Internet User Datagram Protocol (UDP), it may be used to move files between machines on different networks implementing UDP. In addition, Trivial File Transfer Protocol is different from regular File Transfer Protocol (FTP) in that Trivial File Transfer Protocol can only read and write files from or to a remote server. Trivial File Transfer Protocol cannot list directories and has no provisions for user authentication.

While Trivial File Transfer Protocol provides an efficient way to transfer files remotely, it lacks security features, such as user authentication. In particular, Trivial File Transfer Protocol is not secure across subnets. A subnet represents a group of network components that share a common address component, for example, all devices with Internal Protocol addresses that start with 100.100.100. are part of the same subnet. Since Trivial File Transfer Protocol is insecure, the network is compromised when a client from one subnet requests a boot image download from a TFTP server that belongs to another subnet. The network is compromised when access to the client's code is exposed or when the boot image information being downloaded is corrupted or tampered.

Therefore, it would be advantageous to have a method for a secure network install, such that boot images may be uploaded or downloaded across subnets without compromising the network.

SUMMARY OF THE INVENTION

A computer implemented method, an apparatus, and computer instructions for a secure network install are provided. The aspects of the present invention receive a request for a boot image file from a client at a proxy server on a same subnet to form a received request. In one aspect of the present invention, the proxy server is a trivial file transfer protocol server. The client receives a client Internet Protocol address, a location of the boot image file, and an Internet Protocol address of the proxy server from a dynamic host configuration protocol server. The request for a boot image file includes the location of the boot image file and the client Internet Protocol address.

The aspects of the present invention locate a boot image file server from a list of servers and corresponding boot image files for the boot image file to form a located boot image file. The locating step includes performing a lookup of the boot image file in a mapping file and identifying an Internet Protocol address of the boot image file server for the boot image file, wherein the mapping file includes the list of servers and corresponding boot image files.

The aspects of the present invention retrieve the located boot image file from the boot image file server using a secure file transfer protocol to form a retrieved boot image file. The secured file transfer protocol includes at least one of file encryption and checksum verification. The aspects of the present invention send the retrieved boot image file to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
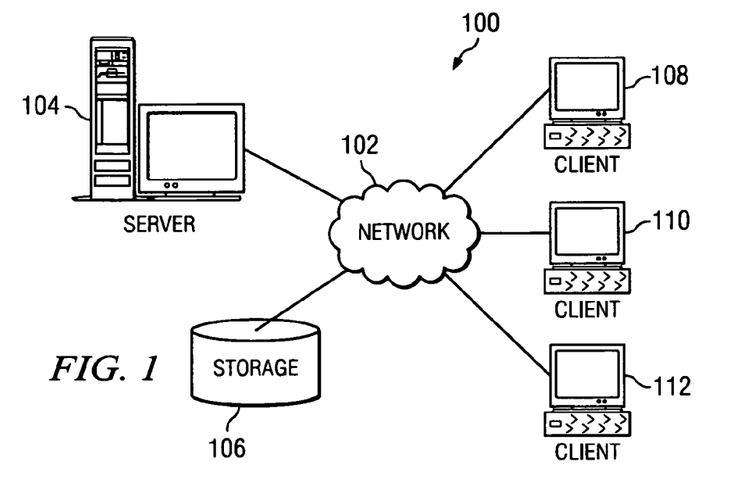
FIG. 1 depicts a pictorial representation of a network of data processing systems in which the present invention may be implemented.
Figure 2:
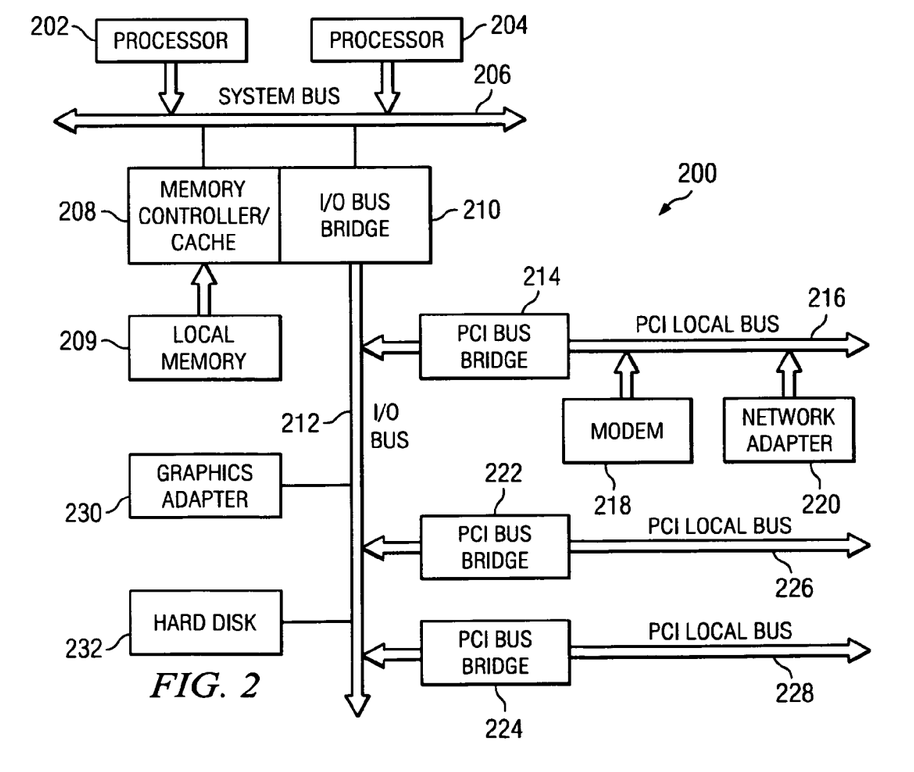
FIG. 2 is a block diagram of a data processing system that may be implemented as a server, in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Figure 3:
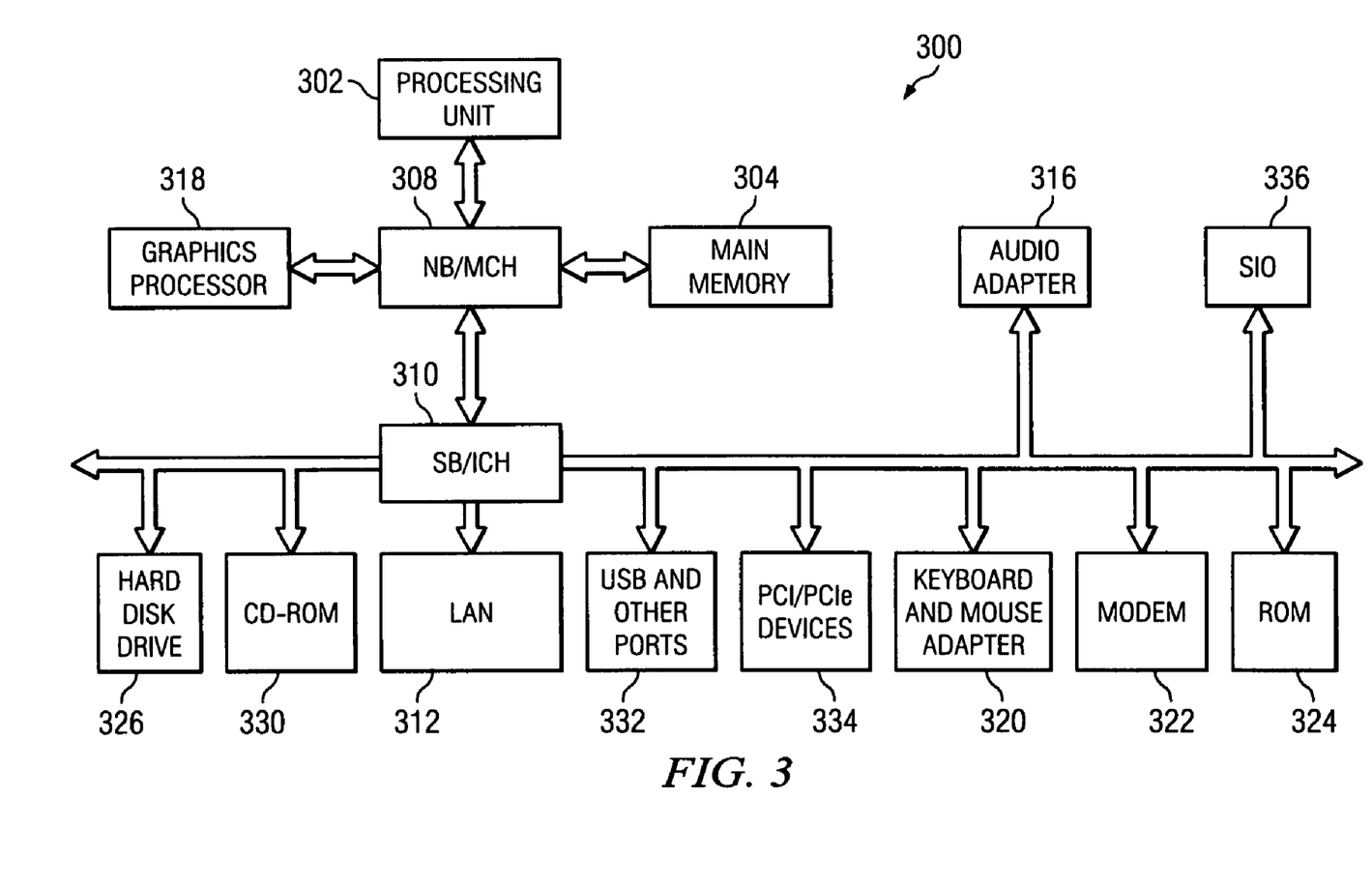
FIG. 3 is a block diagram of a data processing system in which an illustrative embodiment of the present invention may be implemented.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. With reference now to FIG. 3, a block diagram of a data processing system is shown in which aspects of the present invention may be implemented. Data processing system 300 is an example of a computer, such as server 104 or client 108 in FIG. 1, in which code or instructions implementing the processes for embodiments of the present invention may be located.

In the depicted example, data processing system 300 employs a hub architecture including a north bridge and memory controller hub (NB/MCH) 308 and a south bridge and input/output (I/O) controller hub (SB/ICH) 310. Processor 302, main memory 304, and graphics processor 318 are connected to NB/MCH 308. Graphics processor 318 may be connected to the NB/MCH 308 through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to SB/ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive (HDD) 326 and CD-ROM drive 330 may use, for example, an integrated drive electronics (IDE) or serial advanced technology attachment (SATA) interface. A super I/O (SIO) device 336 may be connected to SB/ICH 310.

An operating system runs on processor 302 and coordinates and provides control of various components within data processing system 300 in FIG. 3. As a client, the operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300 (Java is a trademark of Sun Microsystems, Inc. in the United States, other countries, or both).

As a server, the data processing system 300 may be, for example, an IBM eServer™ pSeries® computer system, running the Advanced Interactive Executive (AIX®) operating system or a LINUX operating system (eServer, pSeries and AIX are trademarks of International Business Machines Corporation in the United States, other countries, or both while LINUX is a trademark of Linus Torvalds in the United States, other countries, or both). Instructions for the operating system, the object-oriented programming system, and applications or programs are located on storage devices, such as HDD 326, and may be loaded into main memory 304 for execution by processor 302. The processes for embodiments of the present invention are performed by processor 302 using computer implemented instructions, which may be located in a memory such as, for example, main memory 304, ROM 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Figure 4:
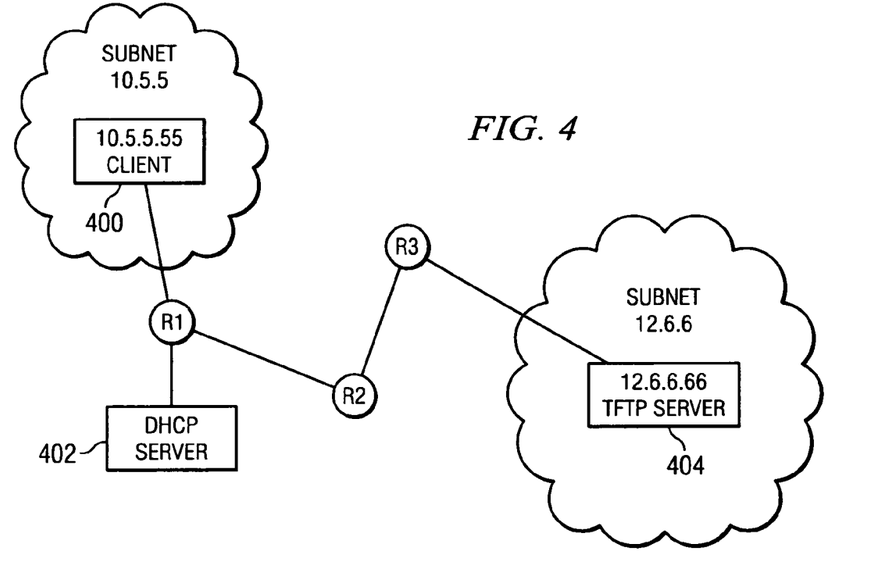
FIG. 4 is a diagram illustrating known interactions between components for network.

Turning now to FIG. 4, a diagram illustrating known interactions between components for network install is depicted. As shown in FIG. 4, when client 400 wants to perform a network install, it first sends a discovery packet to Dynamic Host Configuration Protocol (DHCP) server 402 via default router R1. Client 400 may be implemented as a client data processing system, such as data processing system 300 in FIG. 3, while DHCP server 402 may be implemented as a server data processing system, such as server data processing system 200 in FIG. 2. DHCP server 402 is a server that assigns dynamic Internet Protocol (IP) addresses to devices on a network. In this case, DHCP server 402 assigns client 400 with an IP address of 10.5.5.55, which means that client 400 belongs to a subnet with a subnet mask of 10.5.5.

In addition to the IP address of client 400, DHCP server 402 also sends the location of the boot image file and the IP address of TFTP server 404 to client 400. TFTP server 404 is where the boot image file is stored. In this example, DHCP server 404 sends an IP address of 12.6.6.66, which represents the IP address of TFTP server 404, to client 400. TFTP server 404 belongs to a subnet with a subnet mask of 12.6.6., which is different from the subnet in which client 400 belongs.

Once client 400 receives the information via default router R1, client 400 completes the DHCP protocol for getting the IP address and sends a request for boot image file to IP address 12.6.6.66 via router R1. Router R1 recognizes that the IP address 12.6.6.66 belongs to a different subnet, and thus routes the request to router R2, which in turns routes to router R3, which is the default router for subnet 12.6.6. Router R3 routes the request to TFTP server 404, which locates the boot image file of the request and starts downloading the boot image file to client 400.

While network install may be performed using TFTP server 404, TFTP server 404 does not provide any security feature, such as user authentication. Thus, the network is compromised in that the code of client 400 is exposed to TFTP server 404 and the boot image file being downloaded from TFTP server 404 to client 400 may be corrupted or tampered.

Embodiments of the present invention provide a method, an apparatus, and computer instructions for a secure network install that overcome the problems stated above. One aspect of the present invention provides a secure network install without modifying the client remote boot code. This aspect of the present invention provides a proxy TFTP server that resides in the same subnet as the client. The proxy TFTP server is configured with a list of servers with corresponding boot image files. Responsive to a client request for a boot image file, the proxy TFTP performs a lookup of the boot image file requested and starts a secure download of the file from a boot file server where the boot image file is located. At the same time the boot image file is downloaded, the proxy TFTP server may start uploading of the file to the client.

Figure 5:
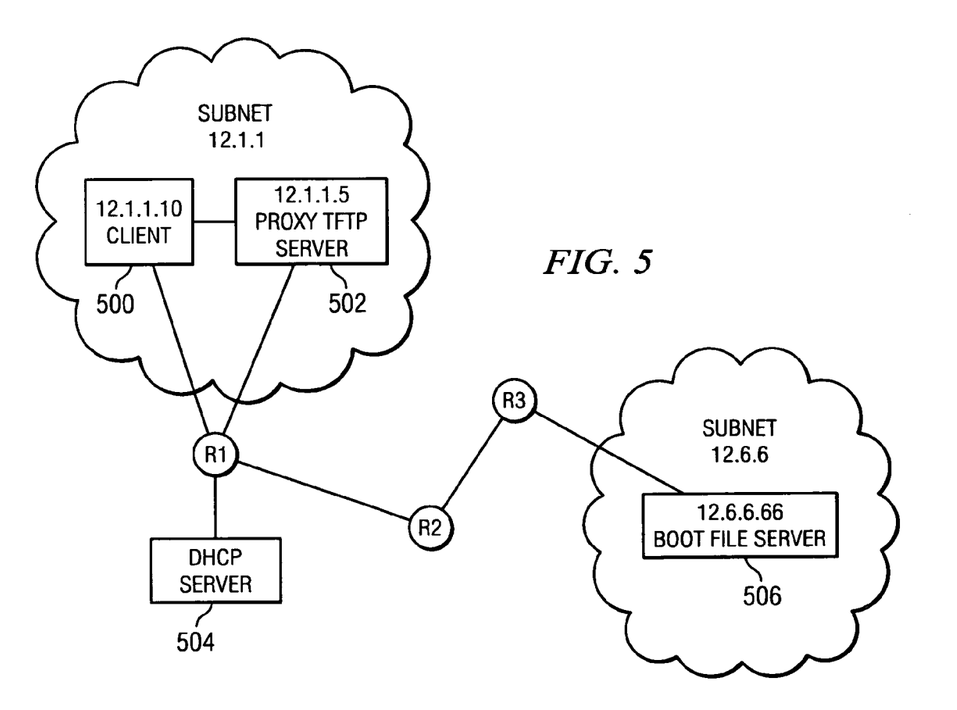
FIG. 5 is a diagram illustrating interactions between components for a secure network install without modifying the client remote boot code, in accordance with an illustrative embodiment of the present invention.

Turning now to FIG. 5, a diagram illustrating interactions between components for a secure network install without modifying the client remote boot code is depicted in accordance with an illustrative embodiment of the present invention. As shown in FIG. 5, proxy TFTP server 502 is provided by an aspect of the present invention in the same subnet as client 500. In this example, client 500 and proxy TFTP server 502 share subnet 12.1.1.

Similar to client 400 in FIG. 4, client 500 initiates a network install by sending a discovery packet to DHCP server 504 via router R1. In turn, DHCP server 504 assigns client 500 an IP address of 12.1.1.10, and sends client 500 a boot image file location, for example, /tmp/AIXbootfile. But instead of sending an IP address of the boot file server, where the boot image file is hosted, DHCP server 504 sends an IP address of 12.1.1.5, which is the IP address of proxy TFTP server 502.

Upon receiving the information, client 500 completes the DHCP protocol for getting the IP address. Client 500 then sends a boot image file request to the IP address of TFTP server 502, in this case, 12.1.1.5, for boot image file located at /tmp/AIXbootfile via router R1. Router R1 recognizes that the IP address 12.1.1.5 belongs to the same subnet, and thus routes the request to proxy TFTP server 502.

When proxy TFTP server 502 receives the request from client 500, proxy TFTP server 502 performs a lookup of the boot image file. Proxy TFTP server 502 may perform a lookup of the boot image file using common lookup techniques, such as, for example, a mapping file that maps boot image files to boot file servers. Once proxy TFTP server 502 locates boot file server 506, proxy TFTP server 502 starts a secure download of the boot image file from boot file server 506 via router R1. Router R1 recognizes that boot file server 506 has an IP address of 12.6.6.66 and resides in subnet 12.6.6. In turn, router R1 routes the requests to router R2, which in turn routes it to router R3, which is the default router for subnet 12.6.6. A secure download of the boot image file is initiated from boot file server 506 to proxy TFTP server 502 using common secure file transfer mechanisms, such as, for example, file encryption and checksum verification.

At the same time the boot image file is downloaded, proxy TFTP server 502 may also start an upload of the boot image file to client 500. By providing proxy TFTP server 502 for uploading of the boot image file, the code of client 500 is prevented from being exposed to boot file server 506, which is across subnets. In addition, the boot image file is prevented from corruption or tampering with a secured download. Furthermore, by providing proxy TFTP server 502, no modification of the remote boot code in client 500 is required to implement this particular aspect of the present invention. In the illustrative example, the remote boot code is a set of instructions that are embedded within the firmware of client 500. The remote boot code is used to locate and upload the boot image file necessary for booting client 500. The use of proxy TFTP server 502 saves time and costs which may otherwise be needed for modifying the remote boot code of client 500.

Another aspect of the present invention provides a secure network install by modifying the client remote boot code. This aspect of the present invention modifies the remote boot code of the client, such that the client may place itself in a special mode, known as a Secure Bootfile Download Discovery (SBDD) mode. When placed in the Secure Bootfile Download Discovery mode, the client sends a boot image file request with the boot image file location and the IP address of the TFTP server as subnet directed broadcast to a specific port, where a proxy TFTP server also provided by this aspect of the present invention is listening. A subnet directed broadcast is a broadcast of data to devices that belong to a specific subnet. Only devices that belong to the specific subnet may receive the data. A subnet directed broadcast prevents devices that are outside the subnet to receive the data.

When the proxy TFTP server hears the boot image file request on the port, the proxy TFTP server starts a secure download of the boot image file from the TFTP server where the boot image file is hosted. After the download is complete, the proxy TFTP server sends a ready for secure download signal to the client, which starts a secure download of the boot image file from the proxy TFTP server.

Figure 6:
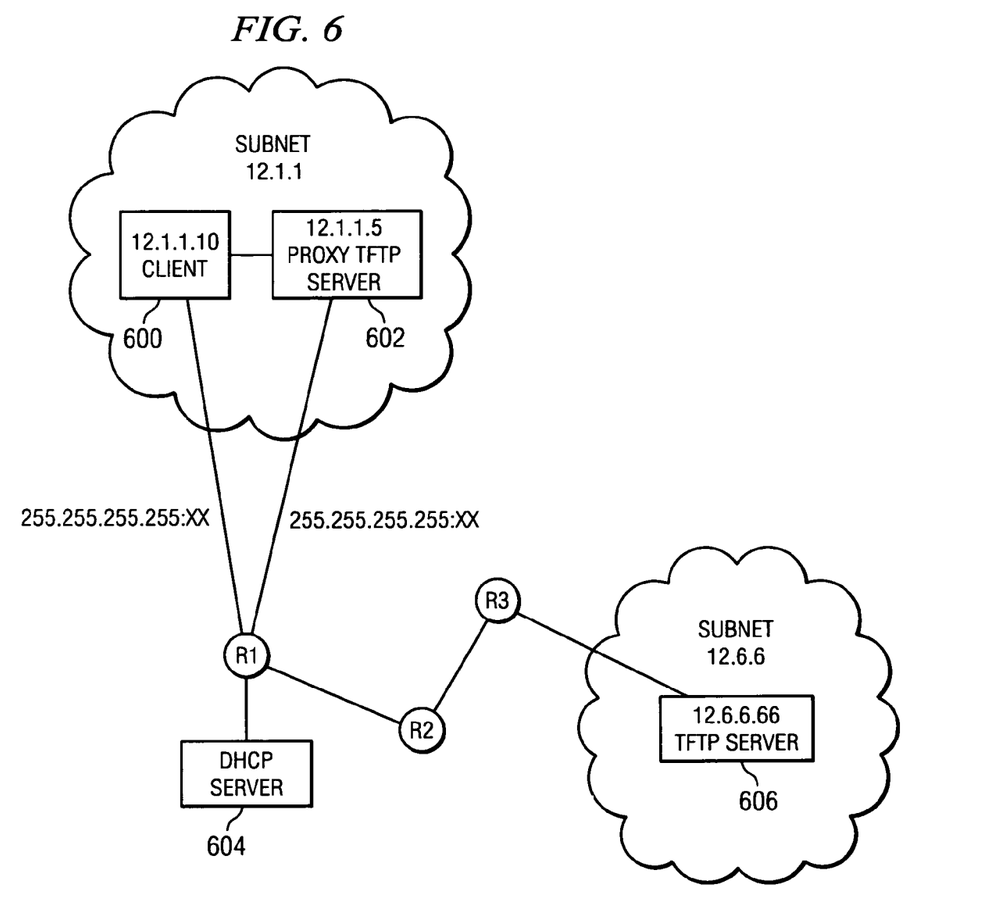
FIG. 6 is a diagram illustrating interactions between components for a secure network install by modifying the client remote boot code, in accordance with an illustrative embodiment of the present invention.

Turning now to FIG. 6, a diagram illustrating interactions between components for a secure network install by modifying the client remote boot code is depicted in accordance with an illustrative embodiment of the present invention. As shown in FIG. 6, client 600 initiates a network install by sending a discovery packet to DHCP server 604 via router R1. In this example, DHCP server 604 assigns client 600 with an IP address of 12.1.1.10, a boot file location of /tmp/AIXbootfile, and TFTP server 606 with an IP address of 12.6.6.66. In this case, TFTP server 606 is where the boot image file is hosted.

Once client 600 receives the information, client 600 completes the DHCP protocol for getting the IP address and starts a special mode known as SBDD mode. Client 600 starts SBDD mode by sending the boot file location of /tmp/AIXbootfile, and the IP address of TFTP server 606, in this case, 12.6.6.66, to a subnet broadcast address and port via R1. An example of the subnet broadcast address and port is 255.255.255.255:XX. 255.255.255.255 is the subnet address and XX is the port.

Proxy TFTP server 602, which resides in the same subnet as the client 600, is configured by the aspect of the present invention to listen for SBDD request on port XX. Thus, when proxy TFTP server 602 hears the broadcast message, which includes a boot image file name with complete path /tmp/AIXbootfile and the IP address of TFTP server 606, proxy TFTP server 602 begins a secure download of the boot image file from TFTP server 606 via routers R1, R2 and R3. Similar to the first aspect of the present invention, the boot image file may be securely downloaded from TFTP server 606 to proxy TFTP server 602 using common secure file transfer mechanisms. These mechanisms include, for example, file encryption and checksum verification. After the download of the boot image file is complete, proxy TFTP server 602 sends a ready for secure download signal to client 600. In turn, client 600 downloads the boot image file from proxy TFTP server 602.

This aspect of the present invention uses proxy TFTP server 602 to provide a secure download of the boot image file. In this manner, the code of client 600 is prevented from being exposed to TFTP server 606, which is located on a different subnet. In addition, the boot image file is prevented from corruption or tampering with a secure download from TFTP server 606 to proxy TFTP server 602. Furthermore, with the modification of the client remote boot code, uniformity may be achieved among multiple clients. Thus, different clients may obtain the same benefit of a secure network install using this aspect of the present invention.

Figure 7A:
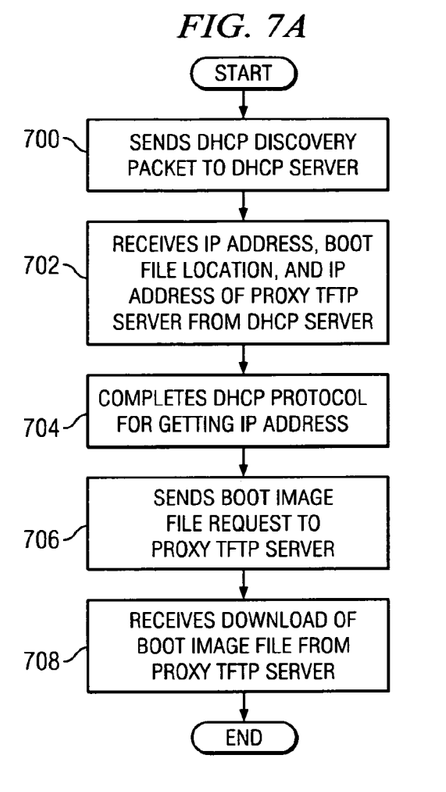
FIG. 7A is a flowchart of an exemplary process performed by a client for a secure network install without modifying the client remote boot code, in accordance with an illustrative embodiment of the present invention.

Turning now to FIG. 7A, a flowchart of an exemplary process performed by a client for a secure network install without modifying the client remote boot code is depicted in accordance with an illustrative embodiment of the present invention. The process in FIG. 7A may be performed by a client, such as client 500 in FIG. 5.

As shown in FIG. 7A, the process begins when the client sends a DHCP discovery packet to the DHCP server (step 700). Next, the client receives its IP address, the boot image file location, and the IP address of a proxy TFTP server from the DHCP server (step 702). The client then completes the DHCP protocol for getting the IP address (step 704) and sends a boot image file request to the proxy TFTP server for the boot image file (step 706). The proxy TFTP server resides in the same subnet as the client. After the proxy TFTP server downloads the image file from a boot file server, the client receives a download of the boot image file from the proxy TFTP server (step 708) and the process terminates thereafter.

Figure 7B:
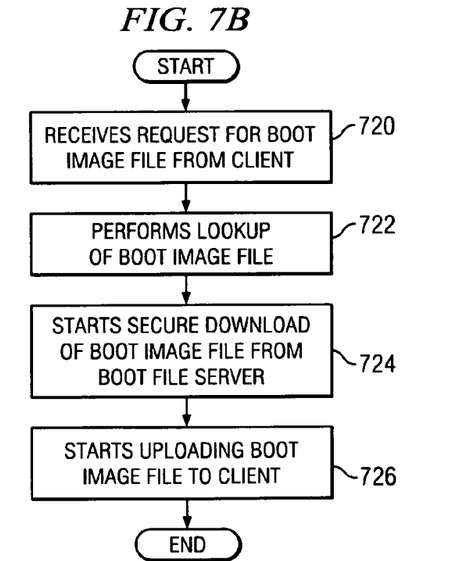
FIG. 7B is a flowchart of an exemplary performed by a proxy TFTP server for a secure network install without modifying the client remote boot code, in accordance with an illustrative embodiment of the present invention.

Turning now to FIG. 7B, a flowchart of an exemplary performed by a proxy TFTP server for a secure network install without modifying the client remote boot code is depicted in accordance with an illustrative embodiment of the present invention. The process in FIG. 7B may be performed by a proxy TFTP server provided by aspects of the present invention, such as proxy TFTP server 502 in FIG. 5.

As shown in FIG. 7B, the process begins when the proxy TFTP server receives a request for a boot image file from a client (step 720). The proxy TFTP server then performs a lookup of the boot image file (step 722). Common lookup mechanisms are used. These mechanisms include, for example, a mapping file that maps boot image files to boot file servers. Once the boot image file is located, the proxy TFTP server starts a secure download of the boot image file from the boot image server (step 724). The proxy TFTP server may download the boot image file using common secure file transfer mechanisms, such as, for example, file encryption and checksum verification. At the same time, the proxy TFTP server may also start uploading the boot image file to the client (step 726) and the process terminates thereafter.

Figure 8A:
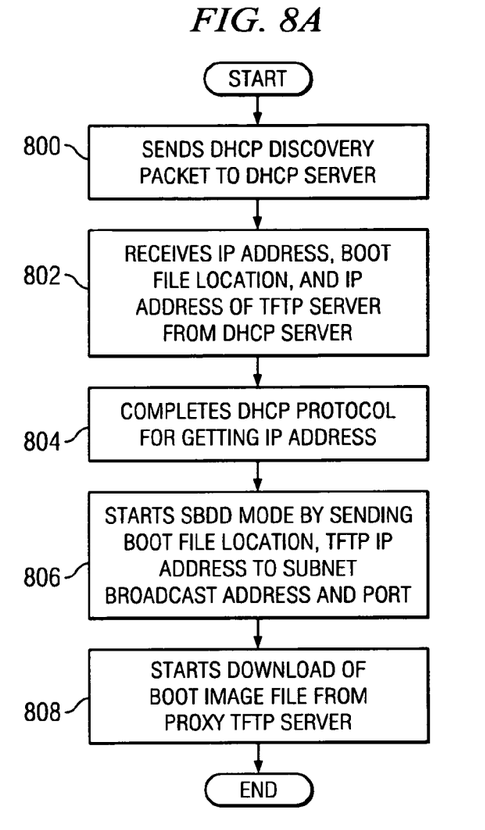
FIG. 8A is a flowchart of an exemplary process performed by a client for a secure network install using modified client remote boot code, in accordance with an illustrative embodiment of the present invention.

Turning now to FIG. 8A, a flowchart of an exemplary process performed by a client for a secure network install using modified client remote boot code is depicted in accordance with an illustrative embodiment of the present invention. The process in FIG. 8A may be performed by a client, such as client 600 in FIG. 6.

As shown in FIG. 8A, the process begins when the client sends a DHCP discovery packet to the DHCP server (step 800). Next, the client receives its IP address, the boot image file location, and an IP address of a TFTP server where the boot image file is hosted (step 802). The client then completes the DHCP protocol for getting the IP address (step 804).

Since the reboot boot code of the client is modified to place itself in a SBDD mode, the client starts the SBDD mode by sending the boot file location and the TFTP IP address to a subnet broadcast address and port, where a proxy TFTP server is listening (step 806). Once the proxy TFTP server downloads the boot image file from the proxy TFTP server, the client starts a secure download of the boot image file from the proxy TFTP server (step 808) and the process terminates thereafter.

Figure 8B:
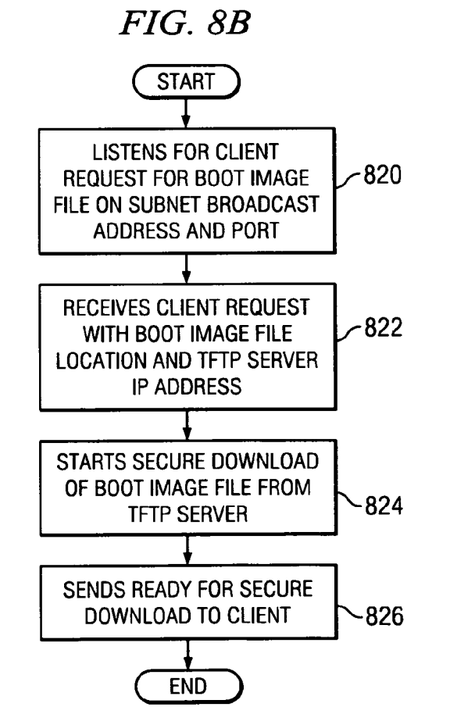
FIG. 8B is a flowchart of an exemplary performed by a proxy TFTP server for a secure network install using modified client remote boot code, in accordance with an illustrative embodiment of the present invention.

Turning now to FIG. 8B, a flowchart of an exemplary performed by a proxy TFTP server for a secure network install using modified client remote boot code is depicted in accordance with an illustrative embodiment of the present invention. The process in FIG. 8B may be performed by a proxy TFTP server provided by aspects of the present invention, such as proxy TFTP server 602 in FIG. 6.

As shown in FIG. 8B, the process begins with the proxy TFTP server listening for a client request for the boot image file on a subnet broadcast address and port (step 820). Next, the proxy TFTP server receives a client request with a boot image file location and an IP address of the TFTP server, where the boot image file is hosted (step 822).

Responsive to receiving the client request, the proxy TFTP server starts a secure download of the boot image file from the TFTP server (step 824) using common secure file transfer mechanisms. These mechanisms include, for example, file encryption and checksum verification, etc. After the download is complete, the proxy TFTP server sends a ready for secure download to the client (step 826) and the process terminates thereafter.

Thus, one aspect of the present invention provides the proxy TFTP server that resides in the same subnet as the client for performing a lookup of the boot image file and downloading the file from a boot file server in a secure manner. The client in turn downloads the file from the proxy TFTP server. In this way, network installs may be performed across subnets in a secure manner. In addition, no modification of client remote boot code is necessary.

In another aspect of the present invention, the client remote boot code is modified to place itself in a SBDD mode. The client starts the SBDD mode by sending a request for a boot image file to a subnet broadcast address and port to all devices that are listening. The proxy TFTP server is provided by this aspect of the present invention to listen to the subnet broadcast address and port, and download the boot image file responsive to receiving the client request. The client in turn downloads the boot image file from the proxy TFTP server. In this way, all clients may be configured to perform network installs in a secure manner. In addition, no additional hardware for security is necessary in either the client or the proxy TFTP server. As a result, it becomes less expensive to provide secure network installs between devices that are across the network.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, a magnetic tape, a removable computer diskette, a random access memory (RAM), a read-only memory (ROM), a rigid magnetic disk, and an optical disk. Current examples of optical disks include compact disk—read only memory (CD—ROM), compact disk—read/write (CD—R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing systems to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a proxy server for a secure network install, wherein the proxy server is a trivial file transfer protocol (TFTP) server, the computer implemented method comprising:

receiving a request for a boot image file from a client at the proxy server to form a received request, wherein the request is for the secure network install by using a modified client remote boot control code, wherein the modified client remote boot control code places the client in a Secure Bootfile Download Discovery (SBDD) mode, wherein the request for the boot image file includes a location of the boot image file and a client Internet Protocol address, and wherein the proxy server and the client are on a same subnet;

locating a boot image file server from a list of servers and corresponding boot image files for the boot image file by performing a lookup of the boot image file in a mapping file to form a located boot image file, wherein the mapping file includes the list of servers and corresponding boot image files;

identifying an Internet Protocol address of the boot image file server for the boot image file;

retrieving the located boot image file from the boot image file server using a secure file transfer protocol to form a retrieved boot image file, wherein the secure file transfer protocol includes at least one of file encryption and checksum verification; and sending the retrieved boot image file to the client, wherein the client receives the client Internet Protocol address, the location of the boot image file, and an Internet Protocol address of the proxy server from a dynamic host configuration protocol server.

* * * * *